(12) United States Patent
Boezen et al.

(10) Patent No.: US 9,192,014 B2
(45) Date of Patent: Nov. 17, 2015

(54) LED SHORT CIRCUIT PROTECTION

(75) Inventors: Henk Boezen, Nijmegen (NL);
Krishnaiah Bellamkonda, Bangalore (IN); Rajesh Swaminathan, Garudacharplaya (IN); Ramesh Karpur, Bangalore (IN)

(73) Assignee: NXP B.V., Eindhoven (NL)

( * ) Notice: Subject to any disclaimer, the term of this patent is extended or adjusted under 35 U.S.C. 154(b) by 341 days.

(21) Appl. No.: 13/275,634

(22) Filed: Oct. 18, 2011

(65) Prior Publication Data

US 2013/0020946 A1  Jan. 24, 2013

Related U.S. Application Data

(60) Provisional application No. 61/509,273, filed on Jul. 19, 2011.

(51) Int. Cl.
*H05B 37/02* (2006.01)
*H05B 33/08* (2006.01)

(52) U.S. Cl.
CPC ........... *H05B 33/0887* (2013.01); *Y02B 20/341* (2013.01)

(58) Field of Classification Search
CPC ............ H02M 3/33592; H02M 7/217; H02M 7/2176; H05B 33/0887
USPC ................................................. 315/308, 127
See application file for complete search history.

(56) References Cited

U.S. PATENT DOCUMENTS

| | | | | |
|---|---|---|---|---|
| 5,485,059 A | * | 1/1996 | Yamashita et al. | 315/307 |
| 5,751,120 A | * | 5/1998 | Zeitler et al. | 315/307 |
| 2008/0297058 A1 | * | 12/2008 | Soos | 315/185 R |
| 2010/0176776 A1 | * | 7/2010 | Wachi | 323/282 |
| 2010/0195257 A1 | * | 8/2010 | Higuchi et al. | 361/91.5 |
| 2010/0225235 A1 | * | 9/2010 | Nagase | 315/130 |
| 2011/0205770 A1 | * | 8/2011 | Isogai et al. | 363/78 |
| 2012/0217873 A1 | * | 8/2012 | Tanaka | 315/82 |

FOREIGN PATENT DOCUMENTS

| | | |
|---|---|---|
| CN | 101636018 A | 1/2010 |
| WO | WO 2011055200 A1 * | 5/2011 |

OTHER PUBLICATIONS

"8-String, White LED Driver with SMBus and PWM Input for LCD Backlight Applications", ADD5203, Analog Devices, Inc. (2010), pp. 1-24.
NXP Semiconductors, "Three-channel switched-mode LED driver", Objective data sheet, pp. 1-25, Rev. 1-8 Feb. 2011.
NXP Semiconductors, "Fully integrated and flexible LED driver for automotive lighting", pp. 1-2, 2010.

* cited by examiner

*Primary Examiner* — Douglas W Owens
*Assistant Examiner* — Monica King (57) ABSTRACT

According to an example embodiment of the present disclosure, a method is provided for controlling a light-emitting-diode (LED) circuit. The method includes receiving a direct current to direct current (DC-to-DC) control signal at a DC-to-DC converter. A DC voltage is generated from an input DC voltage source. The DC voltage has a voltage level that is set according to the DC-to-DC control signal. The DC voltage is provided to an LED circuit output. The DC voltage level from the DC-to-DC converter is determined. The DC-to-DC converter control signal is generated in response to the determined DC voltage level. The LED circuit is determined to have a short circuit based upon the determined DC voltage. In response to determining that the LED circuit has a short circuit, the DC-to-DC converter is disabled from providing the DC voltage to the output for powering an LED circuit.

16 Claims, 3 Drawing Sheets

LED SHORT CIRCUIT PROTECTION

This patent document claims benefit under 35 U.S.C. §119 to U.S. Provisional Patent Application Ser. No. 61/509,273, entitled "Led Short Circuit Protection" and filed on Jul. 19, 2011, which is fully incorporated herein by reference.

Integrated circuit chips that provide driver circuit functions are often designed with several different parameters in mind. Sometimes these parameters conflict with each other and can complicate the resulting design choices. For instance, design parameters may include a large input voltage range, a flexible output voltage range, high efficiency and/or temperature compensation. Assuming a constant output power is delivered by the input, the input current at low input voltage increases. This can cause a corresponding decrease in efficiency. Accordingly, the design of driver circuits can be increasingly complex and costly.

A particular type of driver circuit is a driver circuit designed to be used with light-emitting-diodes (LEDs), such as LEDs that are used for an automotive application. These LEDs are often connected to the driver circuit through a cable and electrical connectors. These LEDs can include automotive exterior or interior lighting applications. These lighting applications can include, but are not limited to, daytime running lights, high beams, low beams and/or turn indicators. These types of lighting applications can use several LEDs arranged in series and may require different lighting levels for the same arrangement of LEDs. Thus, the driver circuits can be designed with a dimming feature.

A potential problem for any driver circuit is a component failure that results in a short circuit. This risk is present in the automotive applications due, at least in part, to the possibility that one of the wires connecting to the cathode or anode of the LEDs is short circuited to the battery supply voltage or to ground. Without proper protection, such a short can cause excessive currents, which can cause damage to the driver or the LEDs.

These and other issues continue to present challenges to the design and methodology associated with driver circuits and integrated circuit chips.

Various example embodiments are directed to power supply circuits and approaches, and to addressing various challenges including those discussed above.

According to an example embodiment of the present disclosure, a method is provided for controlling a light-emitting-diode (LED) circuit. The method includes receiving a direct current to direct current (DC-to-DC) control signal at a DC-to-DC converter. A DC voltage is generated from an input DC voltage source. The DC voltage has a voltage level that is set according to the DC-to-DC control signal. The DC voltage is provided to an LED circuit output. The DC voltage level from the DC-to-DC converter is determined. The DC-to-DC converter control signal is generated in response to the determined DC voltage level. The LED circuit is determined to have a short circuit based upon the determined DC voltage. In response to determining that the LED circuit has a short circuit, the DC-to-DC converter is disabled from providing the DC voltage to the output for powering an LED circuit.

According to other embodiments of the present disclosure, a circuit-based apparatus includes a direct current-to-direct current (DC-to-DC) converter including an inductor. The DC-to-DC converter is configured and arranged to generate, from an input DC voltage source, an output power that is set according to a current level through the inductor. The DC-to-DC converter outputs the DC voltage to an output for powering an LED circuit. A current source of the converter delivers current to the LED. A voltage monitor circuit is configured and arranged to determine the current source voltage across the current source, and to generate the DC-to-DC converter control signal in response to the determined current source voltage. A protection circuit is configured and arranged to receive the determined current source voltage from the voltage monitor circuit; determine that the LED circuit has a short circuit based upon the current source voltage; and generate, in response to determining that the LED circuit has a short circuit, a disable signal to a protection switch that is configured and arranged to prevent the DC-to-DC converter from providing the DC voltage to the output for powering an LED circuit.

The above discussion is not intended to describe each embodiment or every implementation of the present disclosure. The figures and following description also exemplify various embodiments.

Various example embodiments may be more completely understood in consideration of the following detailed description in connection with the accompanying drawings, in which.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the disclosure is to cover all modifications, equivalents, and alternatives falling within the scope of the disclosure including aspects defined in the claims.

The present disclosure is believed to be applicable to a variety of different types of circuits, devices and systems for and/or involving short circuit protection for light-emitting diodes. While the present disclosure is not necessarily limited in this context, various aspects of the disclosure may be appreciated through a discussion of related examples.

In accordance with various example embodiments of the present disclosure, a direct current-to-direct-current (DC-to-DC) converter provides a regulated DC output that is set in response to an analog-to-digital converter (ADC). The ADC is configured to monitor the DC output, and the DC-to-DC converter regulates the DC output in response to a corresponding signal from the ADC. A protection circuit is configured to monitor the signal from the ADC in order to detect a short circuit on the DC output. This multiple use of the ADC can be particularly useful for implanting a protection circuit that does not rely upon separate monitor signals and associated connections/wires to detect a possible short circuit.

In particular embodiments of the present disclosure, a protection circuit operates to provide protection of the anode and cathode side of an entire string of multiple LEDs against a short to battery or to ground. Accordingly, the protection circuit can detect shorts that are internal to the LED string (e.g., an internal LED that is shorted to ground or a battery voltage) as well as shorts on the ends of the LED string (e.g., as might occur if a connector between the LED string and the power providing circuits).

Aspects of the present disclosure are directed toward a circuit that includes a protection switch that can disable current from being provided to an LED string, e.g., in case of a short from the anode side of the LEDs to ground. For instance, a field-effect transistor (FET) can be placed in a current path that connects an output of a DC-to-DC converter to the LED string. When the protection circuit detects a short the FET can be disabled to limit current from flowing through the LED string. In particular embodiments, the FET can be a P-type metal-oxide-semiconductor (PMOS) FET; however, other transistors are also possible.

Other embodiments of the present disclosure are directed toward a system that includes a DC-to-DC converter, with an output current return path to a battery voltage (e.g., rather than to ground). This can be particularly useful for limiting the energy provided to a string of LEDs when the cathode side is shorted to ground and/or limiting the energy to the protection switch when the anode side is shorted to ground.

Consistent with certain embodiments of the present disclosure, a circuit-based apparatus includes a DC-to-DC converter. The DC-to-DC converter is configured to generate, from an input DC voltage source, a DC voltage having a voltage level that is set according to a DC-to-DC control signal. The DC-to-DC converter is also configured to output the DC voltage to an output for powering an LED circuit. A voltage monitor circuit is configured to determine the DC voltage level from the DC-to-DC converter. The voltage monitor circuit generates the DC-to-DC converter control signal in response to the determined DC voltage level. A protection circuit is configured to receive the determined DC voltage from the voltage monitor circuit. The protection circuit detects that the LED circuit has a short circuit based upon the determined DC voltage. In response to determining that the LED circuit has a short circuit, the protection circuit can disable the DC-to-DC converter from providing the DC voltage to the output for powering an LED circuit.

Embodiments of the present disclosure are directed toward an LED driver circuit that includes a pulse-width modulation (PWM) generator. This PWM generator can be used to control the intensity of the light provided by an LED driven by the LED driver circuit. Consistent with certain implementations, the PWM generator is configured to operate at a switching frequency that is sufficiently high so as to be undetectable by the human eye. The PWM generator responds to an input signal that can adjust the duty cycle of the power provided to the LED.

Aspects of the present disclosure are directed toward a driver circuit on an integrated circuit chip. The driver circuit is configured to provide a constant current through the LEDs using a current source. A buck-boost converter provides voltage that is sufficient to allow the current from the current source to flow through the LEDs (e.g., a voltage that is sufficient to overcome the collective diode drops of the LEDs). This can be particularly useful for providing a constant LED current that is substantially independent of the input (battery) voltage and the output voltage ripple of the buck-boost converter. For instance, the driver circuit can be configured to provide the output voltage (VOUT) to an anode terminal of the LEDs and to receive an input voltage from a cathode terminal of the LED (VILED). The current source is then positioned between the anode terminal input and the input voltage. Thus, even where a change occurs in the input voltage or the output voltage, the voltage across the LEDs remains constant. Moreover, the driver circuit can be configured such that voltage ripples on VOUT (e.g., due to switching of the DC-to-DC converter) will be compensated by VILED. In this manner, both the current through the LEDs and the voltage across the LEDs can remain constant.

Consistent with certain embodiments of the present disclosure, the driver circuit can be configured as an automatic buck-boost converter that delivers a constant DC-to-DC voltage to the LEDs independent of the battery voltage. The buck-boost converter can regulate the voltage headroom of the current source to reduce the power dissipation.

Embodiments of the present disclosure relate to a driver circuit that includes a current source that is programmable to a desired LED current level. In the absence of a detected short circuit, the driver circuit samples the voltage across the current source for every DC-to-DC converter cycle in order to modify the peak current setting of the inductor current. This adjustment can be configured to modify the current through an inductive coil to be just enough to maintain a small voltage across the current source. This voltage is just high enough to keep the current source operating properly. Regulation of this voltage can be particularly useful for improving the efficiency of the circuit. In certain implementations, the voltage is kept as low as possible to reduce excessive internal power dissipation in the current source. Consistent with certain embodiments, the regulating voltage is programmable and thereby giving a greater flexibility in optimizing system efficiency (e.g., versus setting values using a costly external component).

Consistent with embodiments of the present disclosure, an ADC is configured to monitor across four comparator levels that define a large and small window across a target voltage for the current source. When there is no short circuit, the driver circuit will provide regulation in order to produce a stable voltage across the current source in between the inner windows. In response to detecting that the voltage has deviated from the target value, the inductor peak current can be adjusted (increased or decreased) to compensate for the voltage deviation. When there is a short on either end of the LED string (e.g., a short to either ground or battery), the current source tries to deliver current to the LED string, but the voltage across the current source is driven to zero volts by the short circuit. For instance, the input voltage can be provided using a series-connected external diode. When a voltage drop exists across the current source, the external diode is forward biased. In the case of a short circuit, however, the external diode can be reverse biased. Aspects of the present disclosure recognize that this type of short-circuit conditions are observable in the output signals from the ADC. For instance, the ADC can detect a voltage across the current source that is below a minimum voltage.

Consistent with other embodiments, the ADC can be configured and arranged to use more or less comparator levels and corresponding windows or to use the ADC for hysteretic control, e.g., the ADC operates with a single reference level and uses a fixed "on"-time to control the output energy. Certain embodiments can provide short circuit protection without a voltage regulation scheme.

In certain instances, the voltage across the current source can drop below the minimum voltage without a short circuit condition. This can occur, for instance, due to noise from external sources or during startup when the output capacitor has not reached a steady-state/final voltage. Thus, the driver circuit can be configured to wait until observed voltage is below the minimum voltage for a predetermined time (e.g., by requiring a number of observed voltages to occur in a row) before a short circuit condition is inferred. In response, the protection switch and/or the DC-to-DC converter can be turned off or otherwise disabled to prevent damage to the LEDs and the driver circuit. For instance, both the inductor current and the programmed LED currents can be lowered to protect the system once a short condition is present.

Embodiments of the present disclosure are directed toward an integrated circuit chip that is configured and arranged to control a short circuit protection switch/FET without any external level shifting circuitry. This can be particularly useful for saving cost and printed circuit board space.

Aspects of the present disclosure can be particularly well-suited for providing a solution that has short circuit detection capabilities, but without the need of special comparator input pins dedicated to the detection of the short circuit. This can be useful for a number of different reasons. For instance, additional input pins require additional pins on an integrated circuit chip and also can cost more. Moreover, a connector and the associated cable can be provided with less connector pins and cable wires running between the LEDs and the integrated circuit chip. These additional components can increase costs as well as represent an additional point of failure.

Certain embodiments of the present disclosure recognize that the current source has a return path to battery voltage, which is particularly useful for limiting the energy to the LEDs in case of a short of the cathode side to ground, and to limiting the energy to the protection switch during a short of the anode side to ground.

Figure 1:
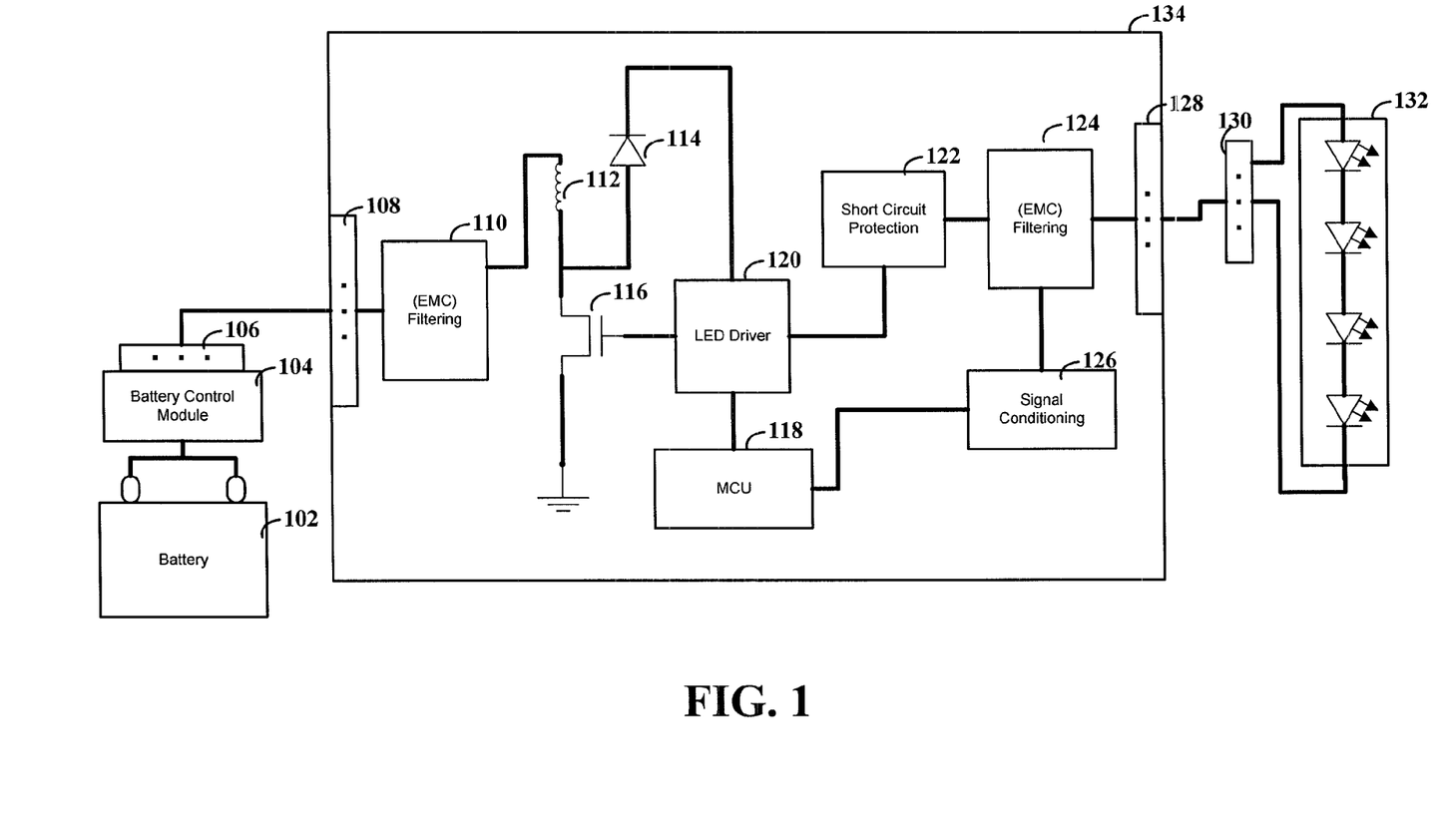
FIG. 1 depicts a system for driving LED components, consistent with embodiments of the present disclosure.

Turning now to the figures, FIG. 1 depicts a system for driving LED components, consistent with embodiments of the present disclosure. Lighting control module 134 provides output power to LEDs 132. Lighting control module 134 receives input power from battery 102. Power from battery 102 can be provided via battery control module 104 and connector 106. The power control module 104 can control whether power is provided from the battery 102, whether current protection is provided (e.g., using a fuse) and/or can condition the power from the battery 102. For an automotive application, the power control module 104 can prevent power from being provided to the lighting control module 134 when the vehicle is turned off and/or if the light associated with LEDs 132 are turned off.

Lighting control module 134 receives input power from the battery 102 from a connector 108. The input power can be filtered using a filter circuit 110, e.g., to provide electromagnetic compatibility (EMC). A converter coil 112, diode 114 and field effect transistor (FET) 116 can be used in connection with a DC-to-DC conversion of the voltage provided by the connector 108. LED driver 120 provides control signals to FET 116 in order to control the DC-to-DC conversion. The output voltage of the DC-to-DC conversion is provided to LEDs 132 using connectors 128 and 130 to cause current to flow through the LEDs 132. The output voltage of the DC-to-DC conversion can be filtered using a filter circuit 124, e.g., to provide electromagnetic compatibility (EMC). Signal conditioning 126 can monitor the voltage across the LEDs and/or the LED current. This information can then be provided to the Microcontroller (MCU) 118.

MCU 118 can be configured to provide a variety of different control and monitoring functions. For instance, the intensity of the light provided by LEDs 132 can be controlled by MCU 118. MCU 118 can provide a PWM signal that determines the duty cycle of power that is provided to the LEDs 132, thereby controlling the intensity. The frequency of this duty cycle can be set to a frequency that is sufficiently high enough that the PWM modulation is not visible to a human observer (although this frequency can still be significantly lower than the switching frequency of the DC-to-DC converter). For instance, the PWM modulation frequency can be around 200 Hz-300 Hz. Consistent with certain embodiments, the duty cycle can also be programmed internally in the chip, which can be particularly useful for low cost applications.

Short circuit protection 122 can prevent current from flowing through the LEDs 132 in response to LED driver 120 detecting a short circuit. For instance, the output voltage of the DC-to-DC conversion can be prevented from reaching the LEDs 132 and the DC-to-DC conversion can be disabled.

In certain embodiments of the present disclosure, the LED driver 120 includes a current source that functions as a current return path connected to the cathode of the LEDs 132. The current source can be connected on one side to the cathode of the LEDs 132 and on the other side to an input voltage to the DC-to-DC converter (e.g., a battery voltage). The DC-to-DC conversion of the LED driver 120 can generate a voltage across the LEDs by generating a voltage higher than the battery voltage. The LED driver 120 can be configured to set a voltage drop across the current source, sometimes referred to as voltage headroom for a current source. This voltage drop can be useful for efficient operation of the current source and also be monitored to detect a short circuit condition. The use of the battery voltage for a current return path, as opposed to a lower voltage/ground, can be particularly useful for limiting damage caused by a short circuit condition.

Figure 2:
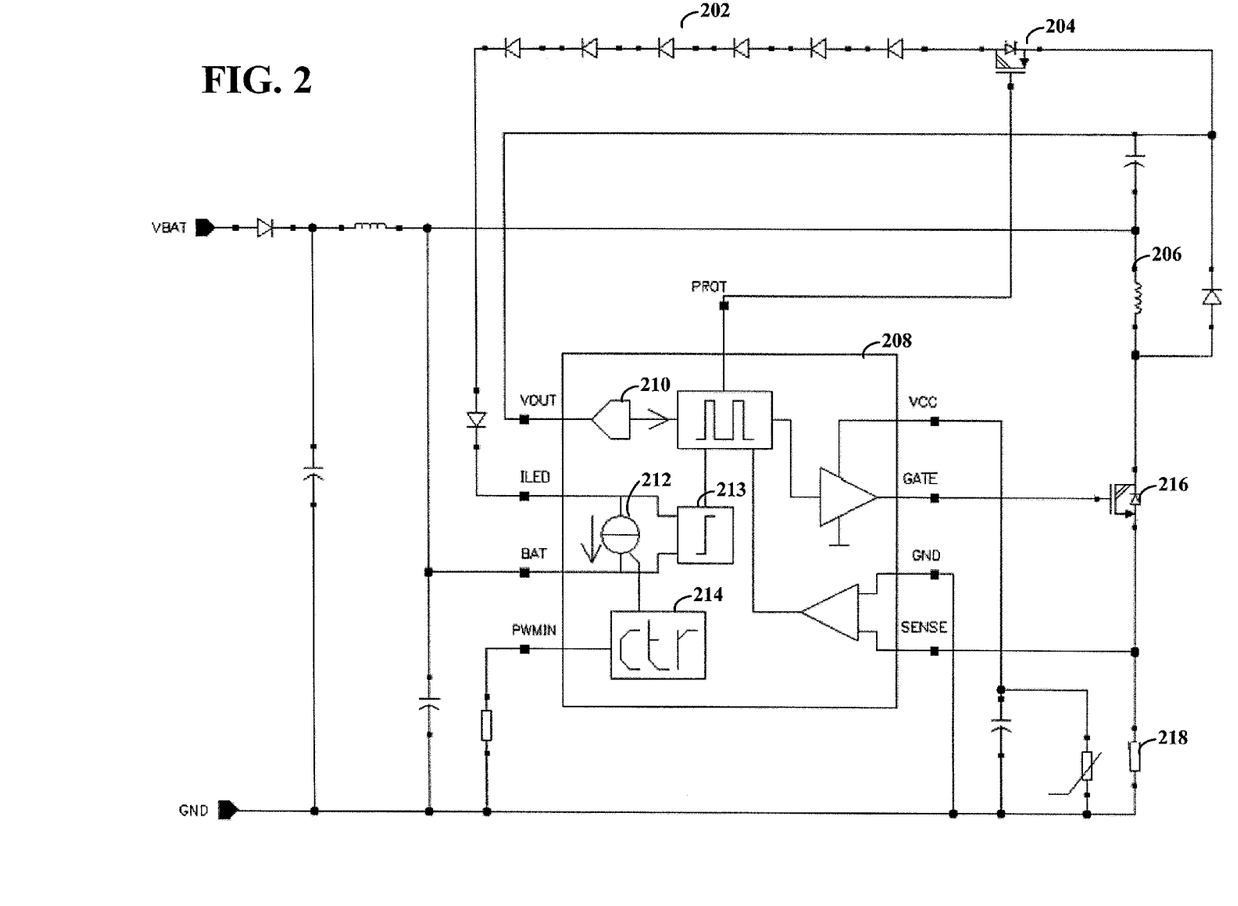
FIG. 2 depicts a circuit diagram for an apparatus configured to drive LEDs, consistent with embodiments of the present disclosure.

FIG. 2 depicts a circuit diagram for an apparatus configured to drive LEDs, consistent with embodiments of the present disclosure. Driver circuit 208 provides control signals for controlling a buck boost DC-to-DC converter and a protection circuit. Driver circuit 208 receives input signals that include a voltage output of the buck boost DC-to-DC converter ("VOUT"), a voltage sense signal ("SENSE") and a PWM signal ("PWMIN"). Driver circuit 208 also receives an input voltage (e.g., the internal battery signal ("BAT") is derived from the external battery source ("VBAT")), which can be from a power source such as a battery. Another input to driver circuit 208 includes the "ILED" input, which is received from the LEDs 202.

Driver circuit 208 controls the gate voltage ("GATE") of transistor 216 (e.g., a field effect transistor or "FET"). This control is in response to the voltage across the current source 212. The ADC 213 (e.g., having the four comparator levels) samples the voltage across the current source 212 every converter cycle. This sampled value is used as an error signal to set the peak current signal. The voltage level across the circuit source is generally a small value (e.g., around 700 mV). Driver circuit 208 switches transistor 216 on causing energy to be stored in inductor 220 by causing a current to flow through the inductor 206. Driver circuit 208 switches off when the predetermined peak inductor current has been reached. The resistor 218 connected between the source of 216 and GND acts as a shunt that converts the inductor current into a voltage. When FET 216 is enabled the inductor current flows through this shunt resistor.

The driver circuit then switches transistor 216 off to generate a voltage across inductor 206 and thereby generate a voltage higher than the input BAT voltage. Driver circuit 208 can adjust the length of time that the transistor 216 is on in order to adjust the inductor current. The inductor peak current can be regulated to a preset value. When this value is reached, the gate of the FET is switched off. The inductor current then flows into the VOUT capacitor. The peak inductor current is responsive to the voltage across the current source 212.

The generated VOUT voltage is provided to one end of diode string 202. The other end of the diode string 202 is connected to an ILED input of the driver circuit 208. Driver circuit 208 provides a current source 212 that generates a constant current through LEDs 202. This results in a voltage drop across the current source 212. The amount of current provided by current source 212 can be programmed at a fixed current. The circuit can be configured to modify the current through the inductive coil 206 to be sufficient to maintain a small voltage across the current source.

Consistent with certain embodiments, without a short circuit present, the external diode connected to the current source 212 is forward biased, and the voltage at the cathode LED connection can be about 1.5-2.0 V higher than the battery voltage. This voltage is determined by the sum of the voltage drop across the current source, and the diode forward bias voltage. Battery voltage is used as the return path for the current source 212 by the use of a capacitor and a connection to the battery voltage.

The voltage at the anode side can be significantly higher than the battery voltage, e.g., 60 V higher. Aspects of the present disclosure are also directed toward applications with many LEDs (e.g., 20 LEDs or more), while operating on a +6 V to +21 V supply (battery) voltage and providing an output current of 1 A.

The shunt resistor connected to the SENSE pin converts the current though the transistor into a voltage. This information can then be used to measure the inductor coil 206 current. Once the maximum value is exceeded, the power switch will be turned off for the current switching cycle. This can be particularly useful for avoiding magnetic saturation and excess current, e.g., due to the coil current being the main path for the supply current.

The PWMIN signal indicates the desired duty cycle for the LEDs, which can allow an external input to control the perceived brightness of light from the LEDs. Driver circuit 208 includes a control circuit 214 ("ctr") that can control the on time of the current source 212. For instance the FET 204 can be used to switch the LED current on and off to produce the desired PWN duty cycle.

VOUT is monitored to detect opens or shorts across the complete LED string. If a short circuit is detected, driver circuit 208 disconnects the VOUT from reaching the LEDs 202 by toggling the protection ("PROT") signal and turning off transistor (FET) 204. Driver circuit 208 can also disable the DC-to-DC converter by keeping the transistor 216 turned off. In some implementations, driver circuit 208 can also disable the current source 212 (e.g., by setting the PWM duty cycle to zero by switching it off, or switching to a low current e.g., 30 mA).

Consistent with embodiments of the present disclosure, a short circuit can be detected when the voltage VOUT is near or below the BAT voltage. This can represent a short between VOUT and BAT or GND. A short circuit can also be detected when ILED is below the BAT voltage or near the VOUT voltage. This could represent a short to GND or VOUT. Still other short circuits can be detected in response to the amount of current, whether the current value of the current source 212 or the sensed current through the inductive coil 206. Combinations of these aspects are also possible. For instance, when the current source 212 is set to a low maximum value (as might occur during startup) the trip point(s) of the voltage detection circuit(s) can be adjusted or even disabled. Once the maximum current value has increased, the trip point(s) can be adjusted accordingly.

ADC 210 provides voltage monitoring capabilities for the input voltage VOUT. ADC 210 can operate at sampling frequencies that are consistent with the switching frequencies of the buck-boost DC-to-DC converter. The sampling frequency can be, for instance, 200 kHz-360 kHz or even higher. ADC 210 serves the function of monitoring for a short circuit condition. Moreover, the voltage across the current source 212 can be determined and used as a feedback to the DC-to-DC converter. For instance, if the voltage across the current source increases, the value of the coil peak current is decreased, and when the voltage becomes lower, value of the coil peak current is increased.

Consistent with embodiments of the present disclosure, the PROT pin can be clamped to the battery voltage. Thus, if a short happens while the LEDs are enabled, and the protection circuit has not yet been enabled (e.g., the short count has not yet been reached), the energy delivered during a short is limited to the energy in the output capacitor. When the capacitor is discharged, the voltage on the source of 204 is also equal to the battery voltage, thus disabling FET 204 and thereby limiting the energy delivered from the time the short happens until the protection circuit is enabled. This can be particularly useful for situations where the anode of the LEDs is shorted to ground, which can be a particularly a harsh condition for FET 204.

Consistent with certain embodiments of the present disclosure, the voltage across the current source can be sampled every DC-to-DC converter cycle using an ADC. The output of this ADC can be used as digital error signal to a P-I (Proportional-Integrating) controller that adjusts the peak current setting for the next cycle. This voltage determination can also serve the additional purpose of monitoring for a short circuit.

Other aspects of the present disclosure recognize the possibility that voltages indicative of a short circuit may occur due to factors other than a short circuit (e.g., due to noise or a sudden change in input voltage). Accordingly, the driver circuit 208 can be configured to monitor for a short circuit that persists during multiple DC-to-DC converter sampling cycles before activating the short circuit protection (e.g., turning off the short circuit protection FET and/or disabling the current source).

According to certain embodiments of the present disclosure, once a short circuit has been detected and the driver circuit 208 can be configured to respond in a number of different manners. For instance, the driver circuit can remain in a protection mode until power is cycled or a reset signal is received. In other instances, the driver circuit 208 can periodically attempt to apply power to the LEDs to determine if the short circuit is still present.

Consistent with embodiments of the present disclosure, the components of driver circuit 208 are contained on a single integrated circuit chip.

Figure 3:
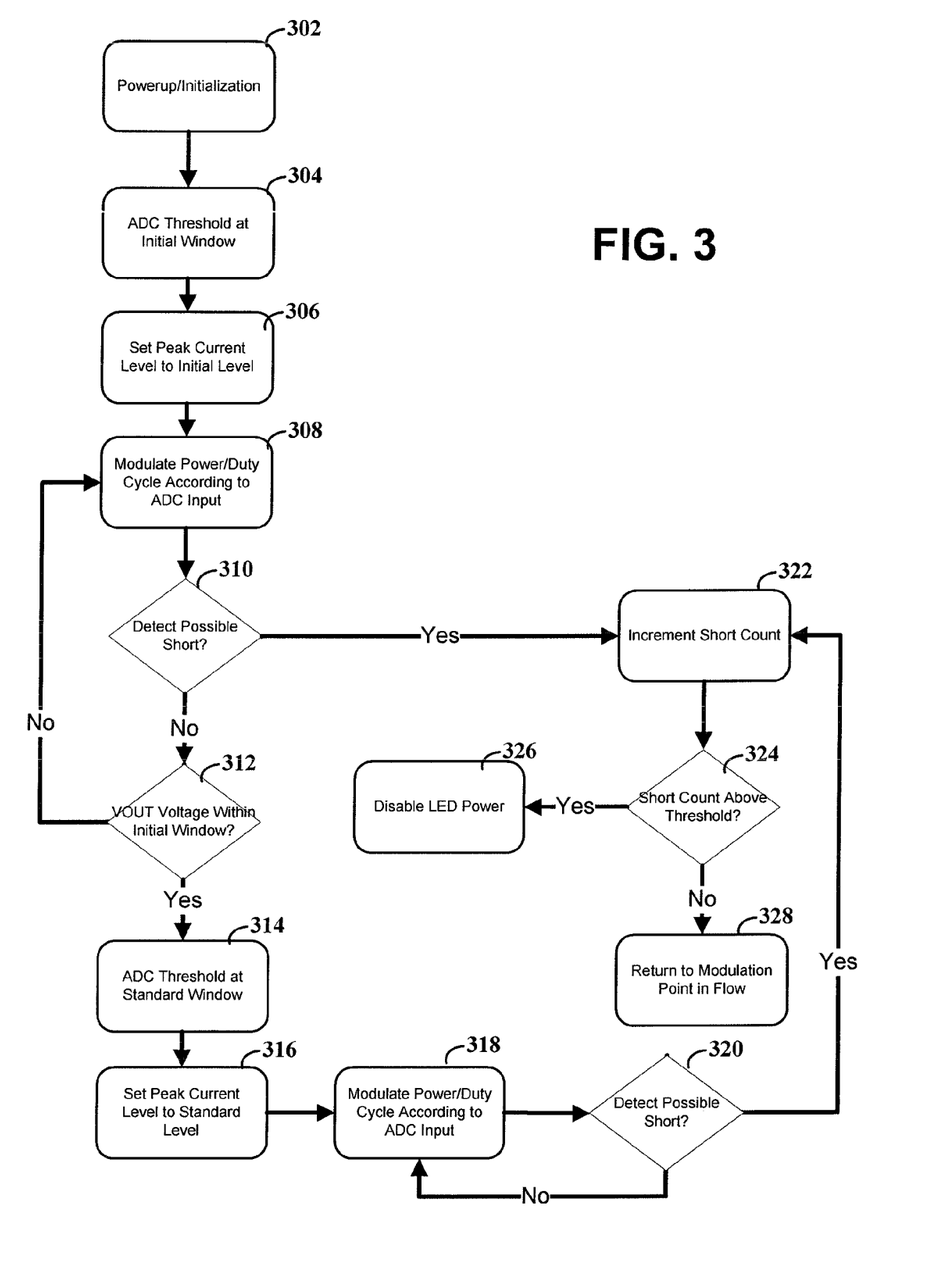
FIG. 3 depicts a flow diagram for a driver circuit, consistent with embodiments of the present disclosure.

FIG. 3 depicts a flow diagram for a driver circuit, consistent with embodiments of the present disclosure. At 302, the driver circuit receives power and undergoes initialization procedures. Thus, the driver circuit can switch from an off mode to an init mode in response to the battery supply voltage rising above the power-off detection threshold level. At 304, the ADC threshold is set to an initial (wide) window. The driver circuit sets the peak voltage to an initial level 306, which results in a corresponding limit of the inductor current. This initial level can be relatively low so as to allow the power and voltages to be gradually increased. At 308, the power/duty cycle of the DC-to-DC converter is modified according to the voltage detected at VOUT input by the ADC. The programmed LED current can also be lowered in order to avoid start up issues. This approach allows for the total system power to be limited, which can be useful to avoid erroneous short detection during start up and also protect the system from a true short circuit during startup.

At 310, the driver circuit monitors for a short circuit using input(s) to the ADC. If a short is detected, then a "short count" value is incremented 322. This short count value represents the number of short circuits that have been detected. In certain instances, the count can be reset after an ADC sampling cycle without a short count or after a set time period in which no short circuits have been detected. The current short count is then compared to a threshold level 324. If the short count is above the threshold, then the short circuit protection is enabled and power is disabled to the LED 326. If, however, the short count does not exceed the threshold, then the modulation portion of the flow continues 328.

At 312, the driver circuit determines whether or not the VOUT voltage is within the initial window. If not, the modulation 308 continues to move the voltage toward the initial window. If the VOUT voltage is within the initial window, then the ADC threshold is set to the smaller standard window 314. The peak current level is then set accordingly at 316.

Consistent with certain embodiments of the present disclosure, it has been recognized that it can be difficult to differentiate between startup conditions and short circuit conditions in LED driver systems. For instance, the voltages on the LEDs (and across the current source) can be similar for both a short circuit situation and a situation in which the system has not yet reached steady state. This can result in erroneous short circuit detections during startup. Accordingly, the circuit can be configured and arranged to operate differently during startup and during steady state. During startup, the circuit begins by operating according to a low power condition (e.g., by having a low value for the peak inductor current). The circuit then transitions from the startup state (low power condition) to the steady state (high power condition). This transition can be accomplished using controlled steps of increasingly higher limits to the peak inductor current and the LED current. This can be particularly useful for providing short circuit detection that accounts for a slow battery power supply ramp rate.

Consistent with particular embodiments, the startup state to steady state transition can be accomplished using a single step from low to high power for both the inductor peak current and the LED current. In such embodiments, the system is designed to ensure enough time is given for the system to reach steady state before short circuit protection would be activated.

In particular embodiments, the controlled startup increase of the peak inductor current is achieved without external components, such as a soft start capacitor. Although embodiments can use an internal soft start capacitor, this can result in an increased die size cost or through low current/capacitor charging scheme. Moreover, an internal capacitor can be sensitive to process and other variations.

The short circuit detection circuit can be configured and arranged to determine that the steady state condition has been reached and to reduce the short detection time (the time over which the short circuit detection must be present before the protection is triggered). In certain implementations, the reduction can be implemented using preprogrammed detection times. For instance, during startup, the system can be configured to require that the short circuit condition be present and detected during a startup time period. Unless the startup time period is met, the short circuit protection will not be activated (e.g., by turning off an external FET switch and/or lowering/disabling current). After the circuit reaches steady state, however, the short circuit protection can be enabled to respond to a short circuit condition that is detected over a reduced (relative to the startup time period) steady-state time period.

Such solutions can be particularly useful for providing reliable short circuit detection. For instance, the number of false startup related short detections can be reduced to provide a glitch-free short detection without compromising the reliability of the protection provided when a real short condition is present.

Other embodiments of the present disclosure recognize that a low duty cycle for the PWM can produce conditions that are similar to startup conditions. Accordingly, the circuit can be configured and arranged to modify the short circuit detection time in response to the PWM having a low duty cycle.

At 318 the power/duty cycle of the DC-to-DC converter is modified according to the voltage detected at VOUT input by the ADC. At 320, the driver circuit monitors for a short circuit using input(s) to the ADC. If a short is detected, then a "short count" value is incremented 322. Otherwise the modulation 318 continues in order to move the VOUT voltage toward a desired voltage level.

The signals and associated logic and functionality described in connection with the figures can be implemented in a number of different manners. Unless otherwise indicated, various general purpose systems and/or logic circuitry may be used with programs in accordance with the teachings herein, or it may prove convenient to construct more a specialized apparatus to perform the required method. For example, one or more of the methods according to the present disclosure can be implemented in hard-wired circuitry, by programming a general-purpose processor, other fully or semi-programmable logic circuitry, and/or by a combination of such hardware and a general-purpose processor configured with software.

One of skill in the art would appreciate that aspects of the disclosure can be practiced with computer/processor-based system configurations other than those expressly described herein. The required structure for a variety of these systems and circuits would be apparent from the intended application and the above description.

It is to be understood that various terms and techniques are used by those knowledgeable in the art to describe communications, protocols, applications, implementations, mechanisms, etc. One such technique is the description of an implementation of a technique expressed in terms of an algorithm or mathematical expression. That is, while the technique may be, for example, implemented as executing code on a computer, the expression of that technique may be more aptly and succinctly conveyed and communicated as a formula, algorithm, or mathematical expression.

Thus, one skilled in the art would recognize a block denoting "C=A+B" as an additive function whose implementation in hardware and/or software would take two inputs (A and B) and produce a summation output (C), such as in combinatorial logic circuitry. Thus, the use of formula, algorithm, or mathematical expression as descriptions is to be understood as having a physical embodiment in at least hardware (such as a processor in which the techniques of the present disclosure may be practiced as well as implemented as an embodiment).

In certain embodiments, machine-executable instructions can be stored for execution in a manner consistent with one or more of the methods of the present disclosure. The instructions can be used to cause a general-purpose or special-purpose processor that is programmed with the instructions to perform the steps of the methods. Alternatively, the steps might be performed by specific hardware components that contain hardwired logic for performing the steps, or by any combination of programmed computer components and custom hardware components.

In some embodiments, aspects of the present disclosure may be provided as a computer program product which may include a machine or computer-readable medium having stored thereon instructions which may be used to program a computer (or other electronic devices) to perform a process according to the present disclosure. Accordingly, the computer-readable medium includes any type of media/machine-readable medium suitable for storing electronic instructions.

Based upon the above discussion and illustrations, those skilled in the art will readily recognize that various modifications and changes may be made to the present disclosure without strictly following the exemplary embodiments and applications illustrated and described herein. For example, the driver circuit can be designed for use with multiple LED strings, each having a separate short circuit protection circuit. Such modifications do not depart from the true spirit and scope of the present disclosure, including that set forth in the following claims. Furthermore, the term "example" as used throughout this document is by way of illustration, and not limitation.

What is claimed is:

1. A circuit-based apparatus comprising:
    a direct current-to-direct current (DC-to-DC) converter including an inductor, the DC-to-DC converter configured and arranged to
        generate, from an input DC voltage source, an output voltage that is set according to a detected current level through the inductor; and
        output the DC voltage to an output for powering an LED circuit;
    a current source configured and arranged to deliver current to an LED using the input DC voltage source as a return path for the delivered current;
    a voltage monitor circuit configured and arranged to
        determine a current-source voltage across the current source; and
        generate a DC-to-DC converter control signal in response to the determined current source voltage; and
    a protection circuit configured to
        receive the determined current source voltage from the voltage monitor circuit;
        determine that the LED circuit has a short circuit based upon the current-source voltage;
        provide, in response to determining that the LED circuit has a short circuit, a disable signal to a protection switch that is configured and arranged to prevent the DC-to-DC converter from providing the DC voltage to the output for powering an LED circuit, and
    wherein the DC-to-DC converter includes circuitry configured to convert power from a DC power supply and, in response, supplies the converted power to the current source which is electrically coupled between the DC-to-DC converter and the LED circuit.

2. The apparatus of claim 1, wherein the voltage monitor circuit includes an analog-to-digital converter (ADC) configured to provide a digital signal representing a value of the determined current source voltage.

3. The apparatus of claim 1, wherein the DC-to-DC converter is configured to operate at switching speeds of greater than 200 kHz, and wherein the current source is further configured and arranged to send control signals to the DC-to-DC converter for provision of the converted power by the DC-to-DC converter.

4. The apparatus of claim 1, wherein
    the DC-to-DC converter is configured to operate at switching speeds of greater than 200 kHz; and
    the voltage monitor circuit includes an analog-to-digital converter (ADC) configured to provide a digital signal representing the determined current source voltage by sampling the current source voltage at a rate corresponding to the DC-to-DC converter switching speed.

5. The apparatus of claim 4, wherein the protection circuit is further configured and arranged to determine that the LED circuit has a short circuit based upon the determined current source voltage being outside of a window for multiple consecutive samplings.

6. The apparatus of claim 1, wherein the disable signal is clamped to the input DC voltage source to limit energy delivered as a result of a short circuit and the protection circuit not being enabled.

7. The apparatus of claim 1, wherein the DC-to-DC converter is further configured and arranged to detect a voltage across a resistor connected between the output for powering the LED circuit and ground and wherein the voltage across the resistor is used to detect the current level through the inductor.

8. The apparatus of claim 1, wherein the protection switch is a PMOS FET that responds to the disable signal by electrically disconnecting an anode of the LED circuit from the output for powering the LED circuit.

9. A method for controlling a light-emitting-diode (LED) circuit, the method comprising:
    receiving a direct current to direct current (DC-to-DC) control signal at a DC-to-DC converter;
    generating, from an input DC voltage source, an output voltage that is set according to a detected current level through an inductor of the DC-to-DC converter;
    providing the output voltage to an LED circuit anode;
    generating, using a current source with a current return path to the input DC voltage source, a current at an LED circuit cathode;
    determining a DC voltage level across the current source;
    generating the DC-to-DC converter control signal in response to the determined DC voltage level;
    determining that the LED circuit has a short circuit based upon the determined DC voltage;
    disabling, in response to determining that the LED circuit has a short circuit, the DC-to-DC converter from providing the DC voltage to the output for powering an LED circuit; and
    wherein the DC-to-DC converter including circuitry converting power from a DC power supply and, in response, supplying the converted power to the current source which is, electrically coupled between the DC-to-DC converter and the LED circuit.

10. The method of claim 9, further including generating a digital signal representing a value of the determined DC voltage level.

11. The method of claim 9, wherein the step of generating the DC-to-DC converter control signal is accomplished at switching speeds of greater than 200 kHz, and wherein the current source is further configured and arranged to send control signals to the DC-to-DC converter for provision of the converted power by the DC-to-DC converter.

12. The method of claim 9, wherein the step of generating the DC-to-DC converter control signal is accomplished at switching speeds of greater than 200 kHz; and further including the step of providing a digital signal representing the determined DC voltage level by sampling the current source voltage at a rate corresponding to the switching speed, and wherein the current source is further configured and arranged to using the digital signal to provide feedback control to the DC-to-DC converter for provision of the converted power by the DC-to-DC converter.

13. The method of claim 12, wherein the step of determining that the LED circuit has a short circuit is based upon the determined DC voltage level being below a threshold value for multiple consecutive samplings.

14. The method of claim 9, further including a step of clamping a disable signal to the input DC voltage source to limit energy delivered as a result of a short circuit that occurs before enablement of a protection circuit that is used to determine that the LED circuit has a short circuit.

15. The method of claim 9, further including a step of detecting a voltage across a resistor connected between the output voltage and ground and wherein the voltage across the resistor is used to detect the current level through the inductor.

16. The method of claim 9, further including a step of disabling a PMOS FET to electrically disconnect the anode of the LED circuit from the output voltage.

* * * * *